United States Patent
Beikmann

(10) Patent No.: US 9,140,622 B2
(45) Date of Patent: *Sep. 22, 2015

(54) SYSTEM AND METHOD FOR CONTROLLING A FIRING SEQUENCE OF AN ENGINE TO REDUCE VIBRATION WHEN CYLINDERS OF THE ENGINE ARE DEACTIVATED

(71) Applicant: GM Global Technology Operations LLC, Detroit, MI (US)

(72) Inventor: Randall S. Beikmann, Brighton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/798,518

(22) Filed: Mar. 13, 2013

(65) Prior Publication Data

US 2014/0069178 A1 Mar. 13, 2014

Related U.S. Application Data

(60) Provisional application No. 61/699,039, filed on Sep. 10, 2012.

(51) Int. Cl.
*G01M 17/00* (2006.01)
*G01L 23/22* (2006.01)
*F02D 41/00* (2006.01)
*F02P 5/15* (2006.01)
*F02D 9/02* (2006.01)

(52) U.S. Cl.
CPC ............ *G01L 23/22* (2013.01); *F02D 41/0082* (2013.01); *F02P 5/1512* (2013.01); *F02D 2009/0233* (2013.01); *F02D 2200/0408* (2013.01); *F02D 2200/1004* (2013.01); *F02D 2250/28* (2013.01); *Y02T 10/46* (2013.01)

(58) Field of Classification Search
CPC ..... G01M 15/12; G01M 17/00; G01M 17/007
USPC ............... 73/114.07, 114.62, 114.63, 114.66, 73/117.01, 117.03
See application file for complete search history.

(56) References Cited

U.S. PATENT DOCUMENTS

| | | |
|---|---|---|
| 4,509,488 A | 4/1985 | Forster et al. |
| 4,535,744 A | 8/1985 | Matsumura |
| 5,042,444 A | 8/1991 | Hayes et al. |
| 5,094,213 A | 3/1992 | Dudek et al. |
| 5,357,932 A | 10/1994 | Clinton et al. |
| 5,423,208 A | 6/1995 | Dudek et al. |
| 5,465,617 A | 11/1995 | Dudek et al. |
| 5,669,354 A | 9/1997 | Morris |
| 6,760,656 B2 | 7/2004 | Matthews et al. |
| 6,978,204 B2 | 12/2005 | Surnilla et al. |
| 7,066,121 B2 | 6/2006 | Michelini et al. |
| 7,100,720 B2 | 9/2006 | Ishikawa |
| 7,292,231 B2 | 11/2007 | Kodama et al. |

(Continued)

OTHER PUBLICATIONS

U.S. Appl. No. 13/798,451, filed Mar. 13, 2013, Rayl.

(Continued)

*Primary Examiner* — Eric S McCall

(57) ABSTRACT

A system according to the principles of the present disclosure includes a vibration prediction module and a firing sequence module. The vibration prediction module predicts a vibration response of a vehicle based on a firing sequence of an engine when a cylinder of the engine is deactivated. The firing sequence module adjusts the firing sequence of the engine based on the predicted vibration response of the vehicle.

20 Claims, 7 Drawing Sheets

(56) References Cited

U.S. PATENT DOCUMENTS

| | | |
|---|---|---|
| 7,363,111 B2 * | 4/2008 | Vian et al. .................... 700/279 |
| 7,577,511 B1 | 8/2009 | Tripathi et al. |
| 7,785,230 B2 | 8/2010 | Gibson et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,954,474 B2 | 6/2011 | Tripathi et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,146,565 B2 | 4/2012 | Leone et al. |
| 8,616,181 B2 | 12/2013 | Sahandiesfanjani et al. |
| 8,646,435 B2 | 2/2014 | Dibble et al. |
| 8,701,628 B2 | 4/2014 | Tripathi et al. |
| 2003/0131820 A1 | 7/2003 | Mckay et al. |
| 2005/0016492 A1 | 1/2005 | Matthews |
| 2005/0235743 A1 | 10/2005 | Stempnik et al. |
| 2006/0107919 A1 | 5/2006 | Nishi et al. |
| 2007/0131196 A1 | 6/2007 | Gibson et al. |
| 2008/0288146 A1 | 11/2008 | Beechie et al. |
| 2009/0177371 A1 | 7/2009 | Reinke |
| 2010/0006065 A1 | 1/2010 | Tripathi et al. |
| 2010/0010724 A1 | 1/2010 | Tripathi et al. |
| 2010/0100299 A1 | 4/2010 | Tripathi et al. |
| 2011/0048372 A1 | 3/2011 | Dibble et al. |
| 2011/0208405 A1 | 8/2011 | Tripathi et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2012/0109495 A1 | 5/2012 | Tripathi et al. |
| 2012/0143471 A1 | 6/2012 | Tripathi et al. |
| 2013/0092128 A1 | 4/2013 | Pirjaberi et al. |

OTHER PUBLICATIONS

U.S. Appl. No. 13/798,351, filed Mar. 13, 2013, Rayl.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,536, filed Mar. 13, 2013, Matthews et al.
U.S. Appl. No. 13/798,435, filed Mar. 13, 2013, Matthews.
U.S. Appl. No. 13/798,471, filed Mar. 13, 2013, Matthews et al.
U.S. Appl. No. 13/798,737, filed Mar. 13, 2013, Beikmann.
U.S. Appl. No. 13/798,701, filed Mar. 13, 2013, Burleigh et al.
U.S. Appl. No. 13/798,518, filed Mar. 13, 2013, Beikmann.
U.S. Appl. No. 13/799,129, filed Mar. 13, 2013, Beikmann.
U.S. Appl. No. 13/798,540, filed Mar. 13, 2013, Brennan et al.
U.S. Appl. No. 13/798,574, filed Mar. 13, 2013, Verner.
U.S. Appl. No. 13/799,181, filed Mar. 13, 2013, Beikmann.
U.S. Appl. No. 13/799,116, filed Mar. 13, 2013, Brennan.
U.S. Appl. No. 13/798,624, filed Mar. 13, 2013, Brennan et al.
U.S. Appl. No. 13/798,384, filed Mar. 13, 2013, Burtch.
U.S. Appl. No. 13/798,775, filed Mar. 13, 2013, Phillips.
U.S. Appl. No. 13/798,400, filed Mar. 13, 2013, Phillips.
U.S. Appl. No. 14/211,389, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 14/548,501, filed Nov. 20, 2014, Beikmann et al.
U.S. Appl. No. 61/952,737, filed Mar. 13, 2014, Shost et al.

* cited by examiner

SYSTEM AND METHOD FOR CONTROLLING A FIRING SEQUENCE OF AN ENGINE TO REDUCE VIBRATION WHEN CYLINDERS OF THE ENGINE ARE DEACTIVATED

CROSS-REFERENCE TO RELATED APPLICATIONS

This application claims the benefit of U.S. Provisional Application No. 61/699,039, filed on Sep. 10, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to systems and methods for controlling a firing sequence of an engine to reduce vibration when cylinders of the engine are deactivated.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Under some circumstances, one or more cylinders of an engine may be deactivated to decrease fuel consumption. For example, one or more cylinders may be deactivated when the engine can produce a requested amount of torque while the one or more cylinders are deactivated. Deactivation of a cylinder may include disabling opening of intake and exhaust valves of the cylinder and disabling fueling of the cylinder.

SUMMARY

A system according to the principles of the present disclosure includes a vibration prediction module and a firing sequence module. The vibration prediction module predicts a vibration response of a vehicle based on a firing sequence of an engine when a cylinder of the engine is deactivated. The firing sequence module adjusts the firing sequence of the engine based on the predicted vibration response of the vehicle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

When a cylinder deactivation system deactivates cylinders of an engine, a firing sequence of the engine may be adjusted in a random or periodic manner to achieve a desired number of deactivated cylinders and/or to change which cylinders are deactivated. The firing sequence may be adjusted without regard to the noise and vibration performance of a vehicle. Thus, a driver may perceive an increase in the noise and vibration of a vehicle when cylinders are deactivated. Therefore, the number of vehicle applications incorporating the cylinder deactivation system may be limited.

A control system and method according to the principles of the present disclosure optimizes a firing sequence of an engine when cylinders of the engine are deactivated to strike a balance between torque output, fuel economy, and vibration. Vibration responses are predicted for multiple firing sequence options that achieve a desired quantity of deactivated cylinders. One of the firing sequence options is selected based on the predicted vibration responses of the firing sequence options.

The vibration response of a firing sequence may be predicted by predicting the vibration responses of torque pulses associated with cylinders in the firing sequence, determining the timing of the vibration responses, and summing the vibration responses. Torque pulses may be estimated for firing cylinders and non-firing cylinders in a firing sequence. Each torque pulse may correspond to a predetermined number (e.g., two) of crankshaft revolutions. The vibration response of each torque pulse may be predicted based on an impulse response function of the relationship between crankshaft torque and vehicle vibration.

The vibration response of a future firing sequence may be affected by the vibration response of previous firing sequences. Thus, the predicted vibration response of a future firing sequence may be added to the vibration responses of previous firing sequences to yield a total vibration response. The total vibration response of each firing sequence option may be expressed as a single value, such as a maximum peak-to-peak value, which may be used to select one of the firing sequence options.

Figure 1:
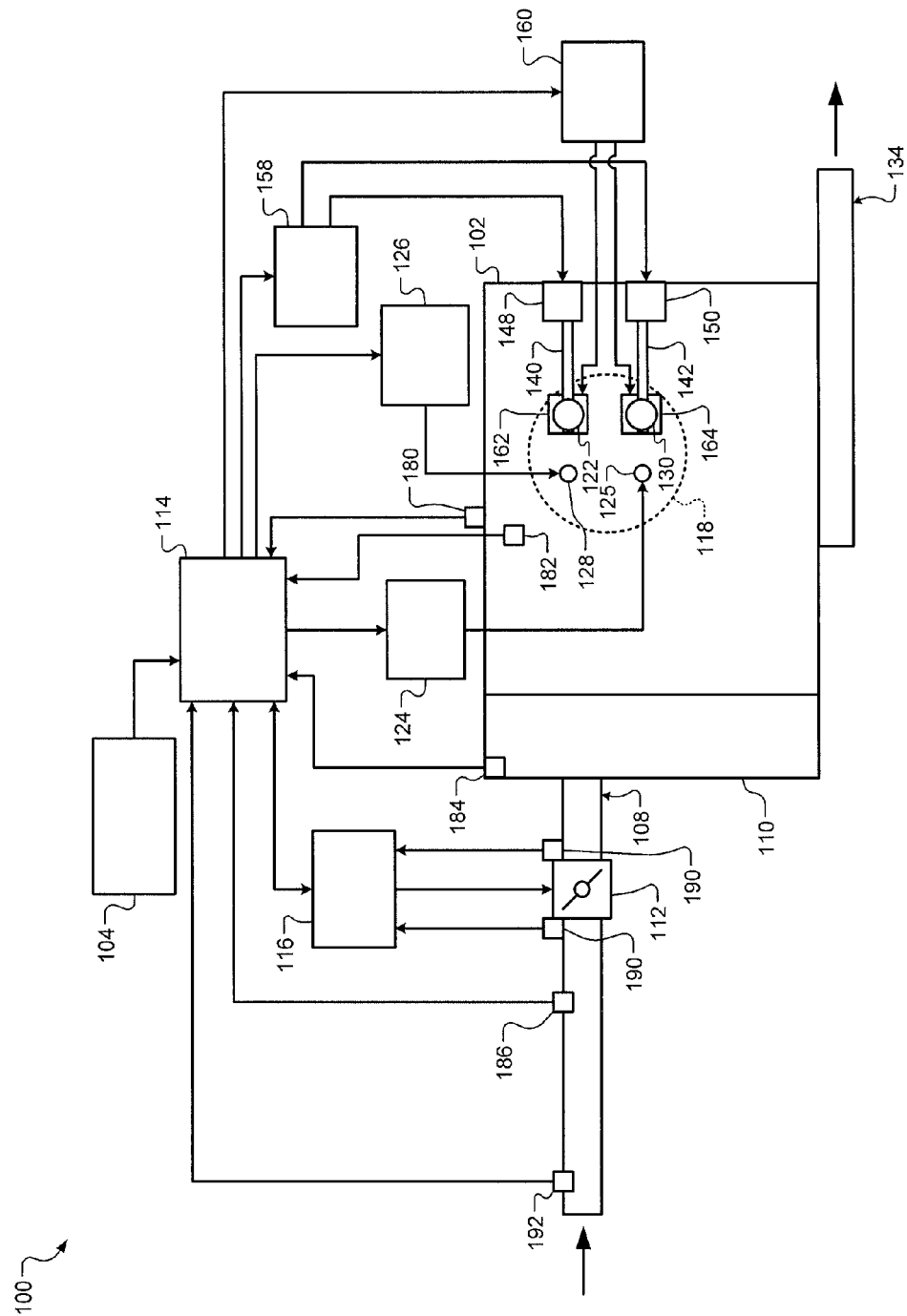
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on driver input from a driver input module 104. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. For illustration purposes, a single representative cylinder 118 is shown. However, the engine 102 may include multiple cylinders. For example, the engine 102 may include 2, 3, 4, 5, 6, 8, 10, and/or 12 cylinders. The ECM 114 may deactivate one or more of the cylinders, which may improve fuel economy under certain engine operating conditions.

The engine 102 may operate using a four-stroke cycle. The four strokes include an intake stroke, a compression stroke, a combustion stroke, and an exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 125 to control the amount of fuel provided to the cylinder to achieve a desired air/fuel ratio. The fuel injector 125 may inject fuel directly into the cylinder 118 or into a mixing chamber associated with the cylinder 118. The fuel actuator module 124 may halt fuel injection into cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114. The spark ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. A firing event causes combustion in a cylinder when an air/fuel mixture is provided to the cylinder (e.g., when the cylinder is active). The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. As the combustion of the air/fuel mixture drives the piston down, the piston moves from TDC to its bottom-most position, referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. The ECM 114 may disable opening of the intake and exhaust valves 122, 130 of cylinders that are deactivated. A phaser actuator module 158 may control the intake cam phaser 148 and the exhaust cam phaser 150 based on signals from the ECM 114. When implemented, variable valve lift (not shown) may also be controlled by the phaser actuator module 158.

The ECM 114 may deactivate the cylinder 118 by instructing a valve actuator module 160 to deactivate opening of the intake valve 122 and/or the exhaust valve 130. The valve actuator module 160 controls an intake valve actuator 162 that opens and closes the intake valve 122. The valve actuator module 160 controls an exhaust valve actuator 164 that opens and closes the exhaust valve 130. In one example, the valve actuators 162, 164 include solenoids that deactivate opening of the valves 122, 130 by decoupling cam followers from the camshafts 140, 142. In another example, the valve actuators 162, 164 are electromagnetic or electrohydraulic actuators that control the lift, timing, and duration of the valves 122, 130 independent from the camshafts 140, 142. In this example, the camshafts 140, 142, the cam phasers 148, 150, and the phaser actuator module 158 may be omitted.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184.

In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

Figure 2:
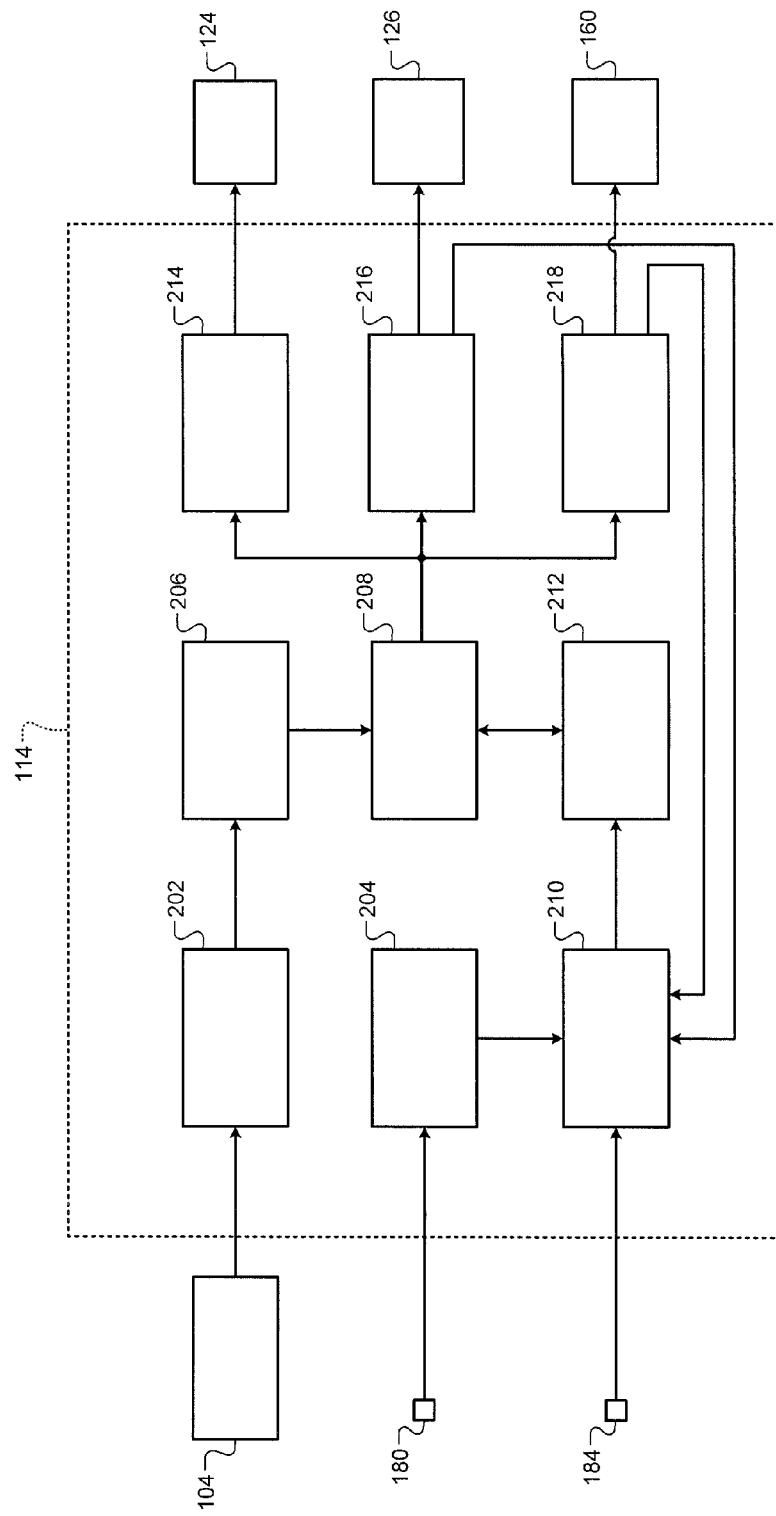
FIG. 2 is a functional block diagram of an example control system according to the principles of the present disclosure.

Referring now to FIG. 2, an example implementation of the ECM 114 includes a torque request module 202, an engine speed module 204, and a cylinder deactivation module 206. The torque request module 202 determines a driver torque request based on the driver input from the driver input module 104. The driver input may be based on a position of an accelerator pedal. The driver input may also be based on input from a cruise control system, which may be an adaptive cruise control system that varies vehicle speed to maintain a predetermined following distance. The torque request module 202 may store one or more mappings of accelerator pedal position to desired torque, and may determine the driver torque request based on a selected one of the mappings. The torque request module 202 outputs the driver torque request.

The engine speed module 204 determines engine speed. The engine speed module 204 may determine the engine speed based on input received from the CKP sensor 180. The engine speed module 204 may determine the engine speed based on an amount of crankshaft rotation between tooth detections and the corresponding period. The engine speed module 204 outputs the engine speed.

The cylinder deactivation module 206 deactivates cylinders in the engine 102 based on the driver torque request. The cylinder deactivation module 206 may deactivate one or more cylinders when the engine 102 can satisfy the driver torque request while the cylinders are deactivated. The cylinder deactivation module 206 may reactivate the cylinders when the engine 102 cannot satisfy the driver torque request while the cylinders are deactivated. The cylinder deactivation module 206 outputs the quantity of deactivated cylinders and/or the quantity of active cylinders.

A firing sequence module 208 determines a firing sequence of the cylinders in the engine 102. The firing sequence module 208 may assess and/or adjust the firing sequence after each engine cycle. Alternatively, the firing sequence module 208 may assess and/or adjust the firing sequence before each firing event in the engine 102. An engine cycle may correspond to 720 degrees of crankshaft rotation. A firing sequence may include one or more cylinder events. For example, a firing sequence may include 4, 5, 8, or 16 cylinder events. A cylinder event may refer to a firing event and/or a crank angle increment during which spark is generated in a cylinder when the cylinder is active. The firing sequence module 208 outputs the firing sequence.

The firing sequence module 208 may change the firing sequence from one engine cycle to the next engine cycle to change the quantity of active cylinders without changing the order in which cylinders are firing. For example, for an 8-cylinder engine having a firing order of 1-8-7-2-6-5-4-3, a firing sequence of 1-8-7-2-5-3 may be specified for one engine cycle, and a firing sequence of 1-7-2-5-3 may be specified for the next engine cycle. This decreases the quantity of active cylinders from 6 to 5.

The firing sequence module 208 may change the quantity of active cylinders from one engine cycle to the next engine cycle based on instructions received from the cylinder deactivation module 206. The cylinder deactivation module 206 may alternate the quantity of active cylinders between two integers to achieve an effective cylinder count that is equal to the average value of the two integers. For example, the cylinder deactivation module 206 may alternate the quantity of active cylinders between 5 and 6, resulting in an effective cylinder count of 5.5.

The firing sequence module 208 may change the firing sequence from one engine cycle to the next engine cycle to change which cylinders are firing, and thereby change which cylinders are active, without changing the quantity of active cylinders. For example, when three cylinders of the 8-cylinder engine described above are deactivated, a firing sequence of 1-7-2-5-3 may be specified for one engine cycle, and a firing sequence of 8-2-6-4-3 may be specified for the next engine cycle. This deactivates cylinders 1, 7, and 5 and reactivates cylinders 8, 6, and 4.

A torque pulse module 210 estimates torque pulses of firing cylinders and non-firing cylinders. A vibration prediction module 212 predicts a vibration response of the vehicle based on the firing sequence and the torque pulses. The vibration prediction module 212 may predict the vibration responses of multiple firing sequence options and output the predicted vibrations. The firing sequence module 208 and/or the vibration prediction module 212 may determine the firing sequence options based on the quantity of deactivated cylinders output by the cylinder deactivation module 206.

The firing sequence module 208 may select one of the firing sequence options based on the predicted vibrations. The firing sequence module 208 may optimize the firing sequence to satisfy the driver torque request while maximizing fuel economy and minimizing vibration. The firing sequence module 208 outputs the firing sequence, as optimized, to a fuel control module 214, a spark control module 216, and a valve control module 218.

The torque pulse module 210 estimates the torque pulses based on engine operating conditions such as the manifold pressure and the engine speed. In various implementations, the torque pulse module 210 may estimate the torque pulses based on spark timing and valve timing, which may be received from the spark control module 216 and the valve control module 218, respectively. When estimating the torque pulses, the torque pulse module 210 may assume that each firing cylinder produces the same torque pulse and each non-firing cylinder produces the same torque pulse despite differences in location (e.g., relative to the intake manifold 110).

The duration of each torque pulse may correspond to a period of a thermodynamic cycle within a cylinder. For example, for a four-stroke engine, the duration of each torque pulse may correspond to two crankshaft revolutions. The torque pulses may start before an intake stroke when a piston in a cylinder is at TDC. Alternatively, the torque pulses may start before an exhaust stroke when a piston in a cylinder is at BDC, which may correspond to the time when the intake and exhaust valves 122, 130 are deactivated.

The vibration prediction module 212 may predict the vibration response of each torque pulse in a firing sequence based on a predetermined relationship between crankshaft torque and vehicle vibration. The predetermined relationship may be developed through laboratory testing and/or finite element analysis, and may be embodied in an equation and/or a lookup table. In various implementations, the predetermined relationship may be embodied as an impulse response function such as a unit impulse response function.

The vibration prediction module 212 may predict the vibration response at one or more locations. For example, the vibration prediction module 212 may predict the vibration response at a driver interface component such as a driver seat, a steering wheel, or a pedal. The vibration prediction module 212 may predict the vibration response in one or more directions. For example, the vibration prediction module 212 may predict the vibration response in the longitudinal, lateral, and vertical directions.

The vibration prediction module 212 may predict the vibration response of each torque pulse in a firing sequence by convolving each torque pulse with the unit impulse response function. The vibration prediction module 212 may predict the vibration response of a firing sequence by determining the timing of the vibration response of each torque pulse in the firing sequence and summing portions of the vibration responses that overlap in time. The vibration prediction module 212 may determine the timing of the vibration responses based on the crankshaft position and the engine speed.

The vibration response of a future firing sequence may be affected by the vibration responses of previous firing sequences since the vibration responses may overlap in time. Thus, the vibration prediction module 212 may sum the vibration response of the future firing sequence with the vibration responses of the previous firing sequences in the manner described above to yield a total vibration response.

The total vibration response may be expressed in terms of a single value. For example, the total vibration response may be expressed as a maximum peak-to-peak value of the total vibration response. Additionally or alternatively, the total vibration response may be expressed as a ratio of the total vibration response to a predetermined vibration response. Various other vibration criteria may be used to quantify the total vibration response. The vibration prediction module 212 may output the firing sequence options and the corresponding total vibration responses.

The vibration prediction module 212 may predict the vibration responses of the firing sequence options and the firing sequence module 208 may select one of the firing sequence options at a first time. A first period between the first time and a second time corresponding to the start of a cylinder event may be adjusted to allow the ECM 114 to activate or deactivate cylinders according to the selected firing sequence option. For example, the first period may be adjusted based on an amount of time required to deactivate the intake and exhaust valves 122, 130.

The fuel control module 214 instructs the fuel actuator module 124 to provide fuel to cylinders of the engine 102 according to the firing sequence. The spark control module 216 instructs the spark actuator module 126 to generate spark in cylinders of the engine 102 according to the firing sequence. The spark control module 216 may output a signal indicating which of the cylinders is next in the firing sequence. The spark control module 216 may output the spark timing of the firing cylinders to the torque pulse module 210. The valve control module 218 instructs the valve actuator module 160 to open intake and exhaust valves of the engine 102 according to the firing sequence. The valve control module 218 may output the valve timing of the firing cylinders to the torque pulse module 210.

In various implementations, for each of the firing sequence options, the vibration prediction module 212 may predict vibration responses for multiple spark timings and multiple manifold pressures. The spark timings and the manifold pressures may be selected from a predetermined range of spark timings and a predetermined range of manifold pressures, respectively. The vibration prediction module 212 may output the firing sequence options, the spark timings, the manifold pressures, and the vibration responses corresponding to each combination of firing sequence option, spark timing, and manifold pressure.

The firing sequence module 208 may optimize the firing sequence, the spark timing, and the manifold pressure to satisfy the driver torque request while maximizing fuel economy and minimizing vibration. The firing sequence module 208 may output the firing sequence, the spark timing, and the manifold pressure, as optimized. The spark control module 216 may then output the optimized spark timing to the spark actuator module 126. In addition, a throttle control module (not shown) and the valve control module 218 may adjust a throttle area and the valve timing, respectively, based on the optimized firing sequence and/or the optimized manifold pressure. The throttle control module may output the throttle area to the throttle actuator module 116. Furthermore, the fuel control module 214 may control the injection amount and/or the injection timing based on the optimized firing sequence.

In various implementations, an optimization module (not shown) may optimize the firing sequence, the spark timing, and the manifold pressure to satisfy the driver torque request while maximizing fuel economy. The optimization module may output the firing sequence, the spark timing, and the manifold pressure, as optimized. The optimization module may perform the optimization and output the results instead of the firing sequence module 208. The optimization module may receive the vibration responses corresponding to each combination of firing sequence option, spark timing, and manifold pressure from the vibration prediction module 212. The optimization module may receive the torque output corresponding to each combination and the fuel economy corresponding to each combination from a torque estimation module (not shown) and a fuel economy module (not shown), respectively. The fuel economy module may estimate the fuel economy of the vehicle for each combination of firing sequence option, spark timing, and manifold pressure. The torque estimation module may estimate the torque output of the engine 102 for each combination of firing sequence option, spark timing, and manifold pressure.

Figure 3:
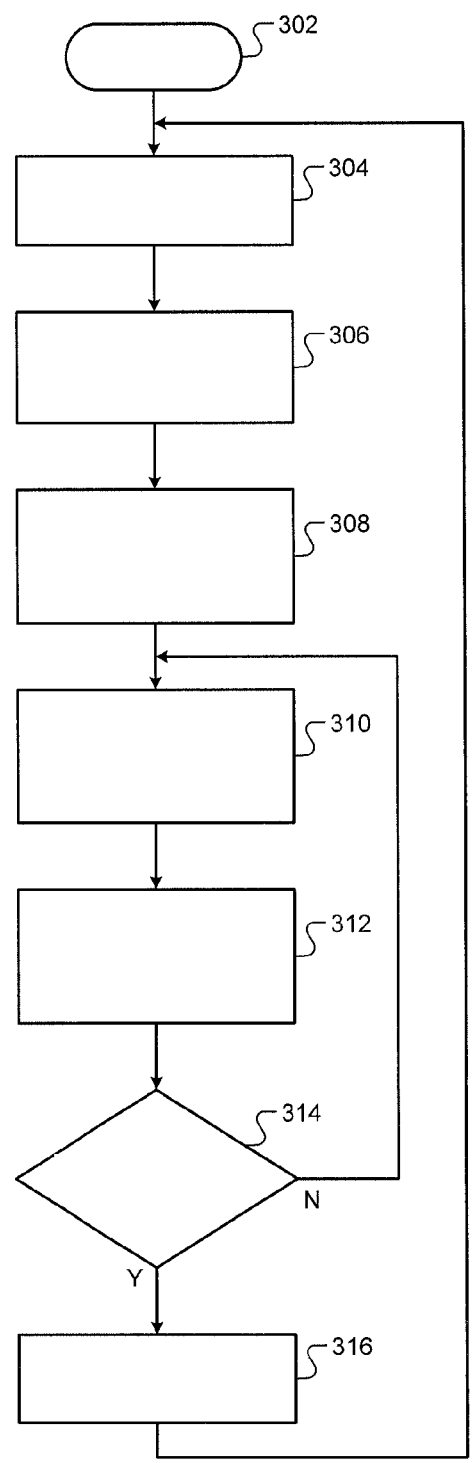
FIG. 3 is a flowchart illustrating an example control method according to the principles of the present disclosure.

Referring now to FIG. 3, a method for controlling a firing sequence of an engine to reduce vibration when cylinders of the engine are deactivated begins at 302. At 304, the method determines firing sequence options. The method may determine the firing sequence options based on the number of cylinders that are deactivated.

At 306, the method estimates torque pulses of firing and non-firing cylinders. The method may estimate the torque pulses based on engine operating conditions such as manifold pressure, engine speed, spark timing, and/or valve timing. When estimating the torque pulses, the method may assume that each firing cylinder produces the same torque pulse and each non-firing cylinder produces the same torque pulse. However, the method may not make this assumption if greater accuracy is desired.

The duration of each torque pulse may correspond to a period of a thermodynamic cycle within a cylinder. For example, for a four-stroke engine, the duration of each torque pulse may correspond to two crankshaft revolutions. The torque pulses may start before an intake stroke when a piston in a cylinder is at TDC. Alternatively, the torque pulses may start before an exhaust stroke when a piston in a cylinder is at BDC.

At 308, the method predicts the vibration response of a vehicle for each torque pulse in a firing sequence option. The method may predict the vibration response based on a predetermined relationship between crankshaft torque and the vibration response. The predetermined relationship may be developed through laboratory testing and/or finite element analysis, and may be embodied in an equation and/or a lookup table. In various implementations, the predetermined relationship may be embodied as an impulse response function such as a unit impulse response function.

The method may predict the vibration response at one or more locations on the vehicle. For example, the method may predict the vibration response at a driver interface component such as a seat, pedal, or a steering wheel. The method may predict the vibration response in one or more directions. For example, the method may predict the vibration response in the longitudinal, lateral, and/or vertical directions.

The method may predict the vibration response of each torque pulse in a firing sequence option by convolving each torque pulse with the unit impulse response function. In some cases, a torque pulse and the unit response function may be convolved once and the resulting vibration response may be stored for repeated use. Then, when the engine operating conditions are the same as or similar to those yielding the torque pulse, the stored vibration response may be retrieved from memory instead of estimating a torque pulse and predicting a vibration response of the torque pulse.

At 310, the method determines the timing of the vibration response for each torque pulse in a firing sequence option. The method may determine the timing of the vibration responses based on the crankshaft position and the engine speed. At 312, the method sums the vibration responses of the torque pulses in a firing sequence option to yield a vibration response for the firing sequence option. The method adds the vibration response of the firing sequence option to the vibration responses of previous firing sequences to yield a total vibration response associated with the firing sequence option.

The total vibration response may be expressed in terms of a single value. For example, the total vibration response may be expressed as a maximum peak-to-peak value of the total vibration response. Additionally or alternatively, the total vibration response may be expressed as a ratio of the total vibration response to a predetermined vibration response. Various other vibration criteria may be used to quantify the total vibration response.

At 314, the method determines whether the vibration response is predicted for each firing sequence option. If the vibration response is predicted for each firing sequence option, the method continues at 316. Otherwise, the method continues at 310. At 316, the method selects one of the firing sequence options based on the predicted vibrations. The method may optimize the firing sequence to maximize fuel economy and minimize vibration while satisfying torque demand.

Figure 4:
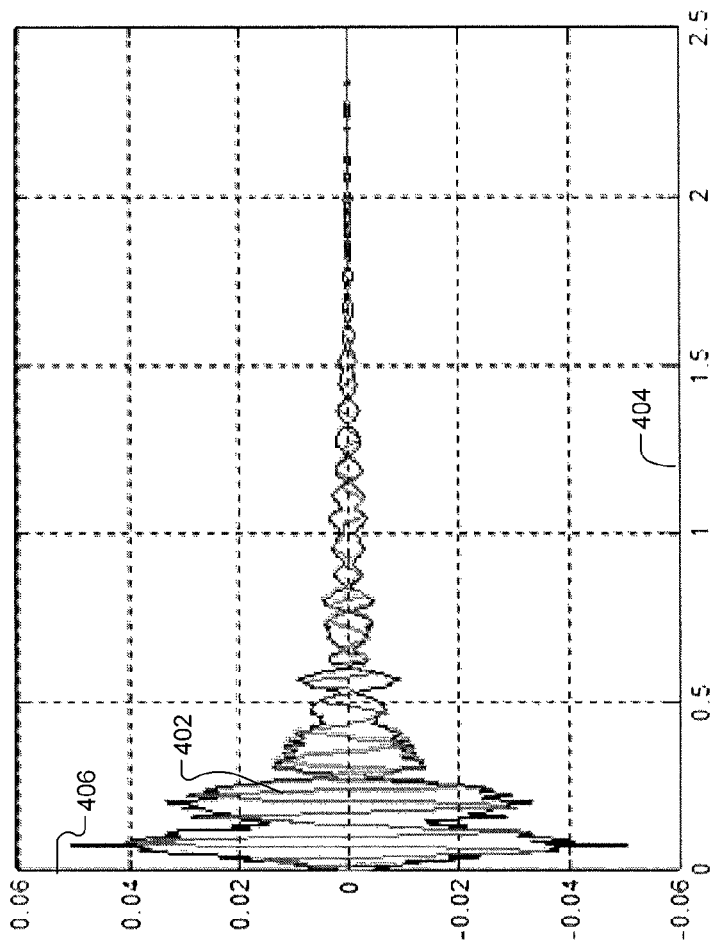
FIGS. 4 through 7 are graphs illustrating example torque pulse signals and vehicle vibration response signals according to the principles of the present disclosure.

Referring now to FIG. 4, an example of a unit impulse response of a vehicle to a crankshaft torque is illustrated at 402. The unit impulse response 402 is plotted with respect to an x-axis 404 and a y-axis 406. The x-axis 404 represents time in seconds. The y-axis 406 represents acceleration in meters per second squared ($m/s^2$).

The unit impulse response 402 is determined by the natural vibration modes of the vehicle. The unit impulse response 402 may be obtained by finite element analysis or physical measurements. The unit impulse response 402 varies for different measurement points on the vehicle body and with the direction of vibration measured.

Figure 5:
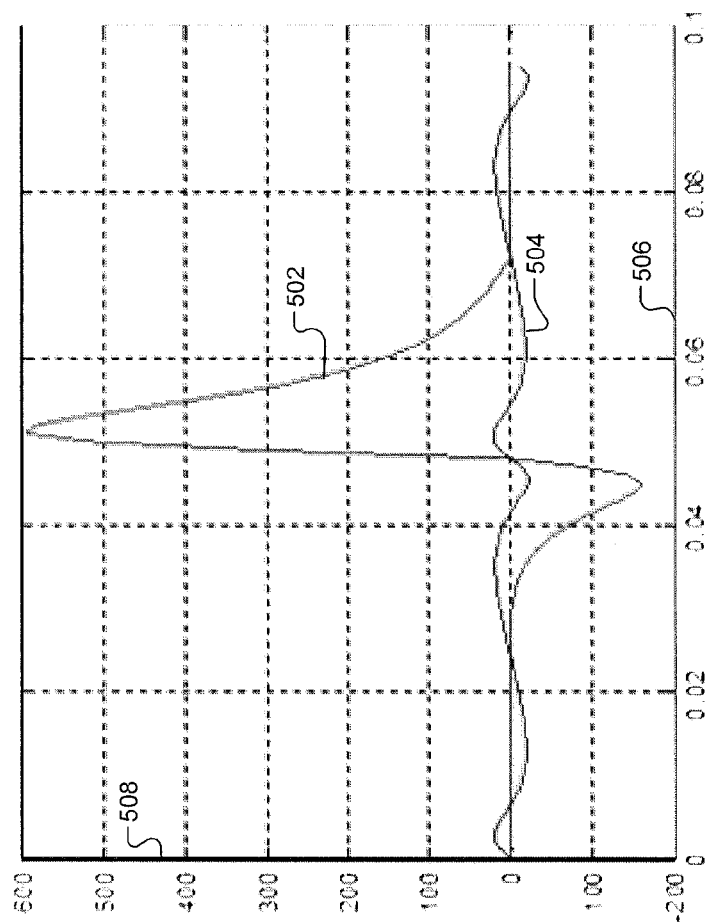

Referring now to FIG. 5, an example of a torque pulse of a firing cylinder in an engine operating at 1250 revolutions per minute (RPM) is illustrated at 502 and an example of a torque pulse of a non-firing cylinder in the engine is illustrated at 504. The torque pulses 502, 504 are plotted with respect to an x-axis 506 and a y-axis 508. The x-axis 506 represents time in seconds. The y-axis 508 represents torque in newton-meters (N-m). The torque pulses 502, 504 last approximately 0.096 seconds. However, as discussed above, torque pulse duration may be based on a predetermined number (e.g., two) of crankshaft rotations, and may therefore depend on engine speed.

Figure 6:
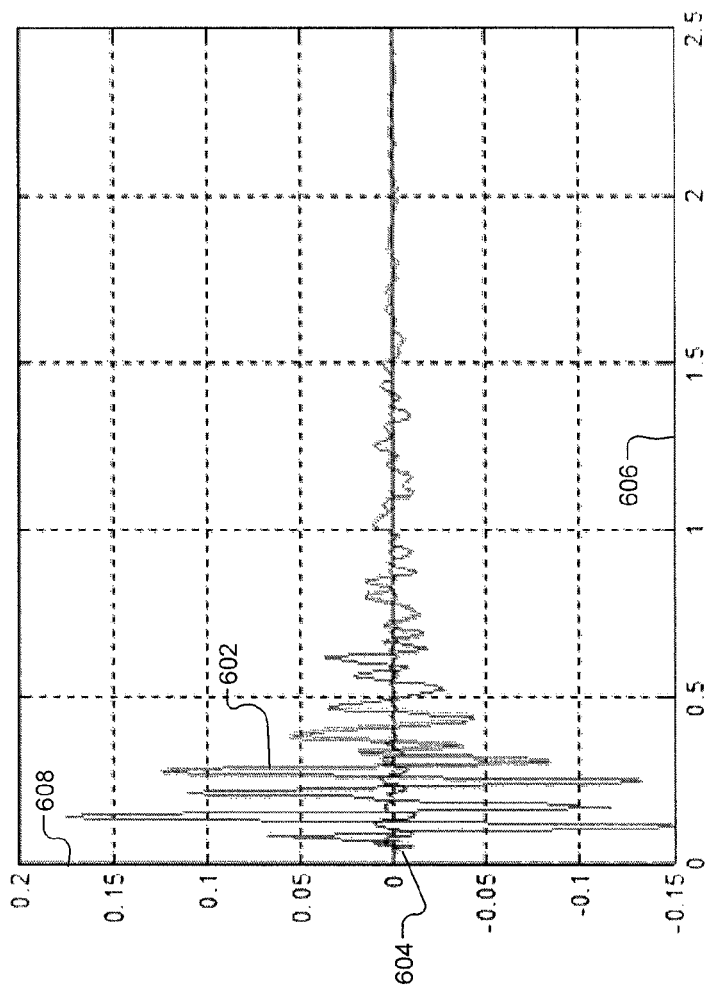

Referring now to FIG. 6, an example of vibration responses of a vehicle characterized by the unit impulse response 402 are illustrated at 602 and 604. The vibration responses 602, 604 are due to the torque pulses 502, 504, respectively. The vibration responses 602, 604 are plotted with respect to an x-axis 606 and a y-axis 608. The x-axis 606 represents time in seconds. The y-axis 608 represents acceleration in $m/s^2$. The vibration responses 602, 604 last for over a second, as shown in FIG. 6, even though the torque pulses 502, 504 only last approximately 0.096 seconds.

Figure 7:
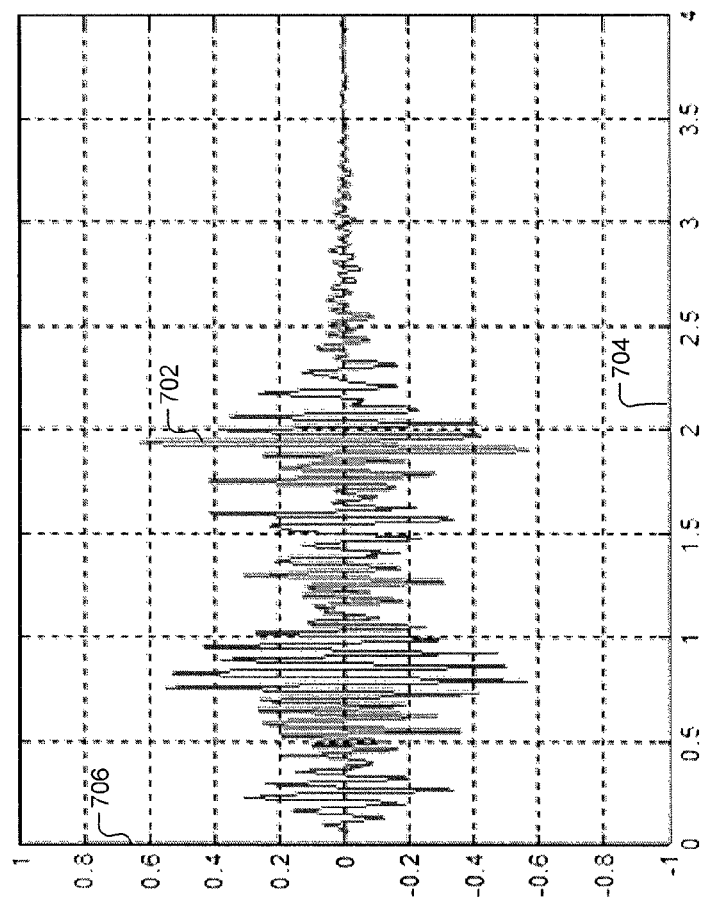

Referring now to FIG. 7, an example of a vibration response of a vehicle due to 160 torque pulses in a V8 engine operating at 1250 RPM is illustrated at 702. The vibration response 702 is plotted with respect to an x-axis 704 and a y-axis 706. The x-axis 704 represents time in seconds. The y-axis 706 represents acceleration in $m/s^2$.

The firing pattern (i.e. the firing sequence) of the engine is selected at random with four out of eight cylinders firing, on average, every two revolutions. The torque pulses occur during 40 crankshaft revolutions between 0 seconds and 1.92 seconds. The vibration response 702 begins to decrease to zero when the torque pulses stop.

FIG. 7 illustrates the adverse effect of randomly selecting a firing sequence. The amplitude of the vibration response 702 is greater than the amplitude of a vibration response induced by an even-firing V8. The frequency of the vibration response 702 is more irregular than the frequency of a vibration response induced by an even-firing V8.

Table 1, provided below, illustrates previously selected firing patterns of a V8 engine, as well as future firing pattern options and their predicted vibration peak levels, according to the principles of the present disclosure. Each firing pattern corresponds to two crankshaft revolutions (e.g., Rev 1-2). In each firing pattern, "1" represents a firing (i.e., active) cylinder and "0" represents a non-firing cylinder. The vibration peak level is a ratio of a predicted vibration response to a predetermined vibration response.

TABLE 1

| Most Recent Patterns (Already Determined) | | | | | Future Pattern Options | |
|---|---|---|---|---|---|---|
| Rev 1-2 | Rev 3-4 | Rev 5-6 | Rev 7-8 | Rev 9-10 | Pattern | Vibration Peak Level |
| 10110101 | 11011101 | 01011011 | 11011011 | 01101011 | 10111101 | 0.80 |
| | | | | | 11011011 | 0.60 |

TABLE 1-continued

| Most Recent Patterns (Already Determined) | | | | | Future Pattern Options | |
|---|---|---|---|---|---|---|
| | | | | | | Vibration |
| Rev 1-2 | Rev 3-4 | Rev 5-6 | Rev 7-8 | Rev 9-10 | Pattern | Peak Level |
| | | | | | 11101101 | 0.90 |
| | | | | | 11011101 | 0.55 |
| | | | | | 01110111 | 1.00 |
| | | | | | . | . |
| | | | | | . | . |
| | | | | | . | . |

The firing patterns alternate between 5 active cylinders and 6 active cylinders to achieve an effective cylinder count of 5.5. The firing pattern options yield 6 active cylinders since the firing pattern of the last revolution (i.e., Rev 9-10) yields 5 active cylinders.

A firing pattern option may include one or more cylinder events. The number of cylinder events in a firing pattern option may be predetermined to reduce the number of decisions made within a given period, to utilize prior determinations regarding the vibration response of certain firing sequences, and/or to ensure smooth torque delivery. In Table 1, the firing pattern options each include 8 cylinder events with 6 firing events.

The vibration responses of the previously selected firing patterns are predicted by convolution and summation in the manner described above to yield a present vibration response. The vibration responses of the future firing pattern options are predicted and summed with the present vibration response to yield a total vibration response. Depending on the phase and amplitude of the predicted vibration response relative to the present vibration response, the predicted vibration response may constructively or destructively interfere with the present vibration response in different frequency ranges.

The total vibration response predicted for each firing pattern option is divided by a predetermined vibration response to yield the vibration peak levels. The predetermined vibration response may be a specification. Thus, a vibration peak level may satisfy the specification when the vibration peak level is less than or equal to 1.00.

In Table 1, the firing pattern option of 11011101 yields a vibration peak level of 0.55, which is the lowest vibration peak level of those listed in Table 1. However, this firing pattern option may not be selected for the next engine cycle due to performance factors other than the vehicle vibration response, such as torque delivery.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
    a vibration prediction module that predicts a vibration response of a vehicle based on a firing sequence of an engine when a cylinder of the engine is deactivated; and
    a firing sequence module that adjusts the firing sequence of the engine based on the predicted vibration response of the vehicle.

2. The system of claim 1 wherein the vibration prediction module predicts the vibration response based on torque pulses of firing cylinders and non-firing cylinders in the firing sequence.

3. The system of claim 2 wherein the vibration prediction module:
    predicts the vibration response for each torque pulse;
    determines the timing of the vibration response for each torque pulse; and
    sums portions of the vibration responses that overlap in time to yield the vibration response of the firing sequence.

4. The system of claim 2 further comprising a torque pulse module that estimates the torque pulses based on a pressure within an intake manifold of the engine and engine speed.

5. The system of claim 2 wherein the vibration prediction module predicts the vibration response of each torque pulse based on a predetermined relationship between crankshaft torque and vehicle vibration.

6. The system of claim 5 wherein the predetermined relationship includes an impulse response function.

7. The system of claim 1 wherein:
the vibration prediction module predicts the vibration response of the vehicle corresponding to multiple firing sequence options; and
the firing sequence module selects one of the firing sequence options based on the predicted vibration response of the vehicle.

8. The system of claim 7 wherein the firing sequence module determines the firing sequence options based on a quantity of active cylinders that satisfies a driver torque request.

9. The system of claim 7 wherein the vibration prediction module:
determines a first vibration response for a previous firing sequence;
predicts a second vibration response for each of the firing sequence options;
determines a total vibration response for each of the firing sequence options based on the first vibration response and the corresponding second vibration response; and
selects one of the firing sequence options based on the total vibration response.

10. The system of claim 9 wherein the vibration prediction module determines the total vibration response for each of the firing sequence options by:
determining the timing of the first vibration response and the corresponding second vibration response; and
summing portions of the first vibration response and the corresponding second vibration response that overlap in time.

11. A method comprising:
predicting a vibration response of a vehicle based on a firing sequence of an engine when a cylinder of the engine is deactivated; and
adjusting the firing sequence of the engine based on the predicted vibration response of the vehicle.

12. The method of claim 11 further comprising predicting the vibration response based on torque pulses of firing cylinders and non-firing cylinders in the firing sequence.

13. The method of claim 12 further comprising:
predicting the vibration response for each torque pulse;
determining the timing of the vibration response for each torque pulse; and
summing portions of the vibration responses that overlap in time to yield the vibration response of the firing sequence.

14. The method of claim 12 further comprising estimating the torque pulses based on a pressure within an intake manifold of the engine and engine speed.

15. The method of claim 12 further comprising predicting the vibration response of each torque pulse based on a predetermined relationship between crankshaft torque and vehicle vibration.

16. The method of claim 15 wherein the predetermined relationship includes an impulse response function.

17. The method of claim 11 further comprising:
predicting the vibration response of the vehicle corresponding to multiple firing sequence options; and
selecting one of the firing sequence options based on the predicted vibration response of the vehicle.

18. The method of claim 17 further comprising determining the firing sequence options based on a quantity of active cylinders that satisfies a driver torque request.

19. The method of claim 17 further comprising:
determining a first vibration response for a previous firing sequence;
predicting a second vibration response for each of the firing sequence options;
determining a total vibration response for each of the firing sequence options based on the first vibration response and the corresponding second vibration response; and
selecting one of the firing sequence options based on the total vibration response.

20. The method of claim 19 further comprising determining the total vibration response for each of the firing sequence options by:
determining the timing of the first vibration response and the corresponding second vibration response; and
summing portions of the first vibration response and the corresponding second vibration response that overlap in time.

* * * * *

UNITED STATES PATENT AND TRADEMARK OFFICE
CERTIFICATE OF CORRECTION

PATENT NO. : 9,140,622 B2  
APPLICATION NO. : 13/798518  
DATED : September 22, 2015  
INVENTOR(S) : Randall S. Beikmann It is certified that error appears in the above-identified patent and that said Letters Patent is hereby corrected as shown below:

Title Page, Item [73] Assignee, insert the following:
--GM Global Technology Operations LLC, Detroit, MI (US)--

Signed and Sealed this
Twenty-ninth Day of March, 2016

Michelle K. Lee
*Director of the United States Patent and Trademark Office*